United States Patent [19]
Gee

[11] 3,965,849
[45] June 29, 1976

[54] COILED EDGE GUIDE FOR ROD-TUBE SIGNAL DEVICE AND METHOD

[75] Inventor: Glen R. Gee, Selma, Calif.

[73] Assignee: Minnesota Mining and Manufacturing Company, Saint Paul, Minn.

[22] Filed: Mar. 17, 1975

[21] Appl. No.: 559,166

[52] U.S. Cl............................... 116/114.5; 29/511; 72/367; 73/352; 73/358;322; 264/339
[51] Int. Cl.²................... B29C 17/02; G01K 11/06
[58] Field of Search ...... 116/114.5, 114 Y, 114 PV; 73/358, 368.3, 322, 352; 99/342; 426/88; 337/407, 408, 409; 277/403, 404; 264/285, 339, 320; 29/511; 72/367, 377

[56] References Cited
UNITED STATES PATENTS

| | | |
|---|---|---|
| 3,032,825 | 5/1962 | Proud ............................ 264/339 X |
| 3,394,572 | 7/1968 | Van Allman........................... 72/367 |
| 3,410,939 | 11/1968 | Driza et al. ........................ 29/511 X |
| 3,548,780 | 12/1970 | Kliewer............................ 116/114.5 |
| 3,779,080 | 12/1973 | Smith............................ 116/114 PV |
| 3,820,499 | 6/1974 | Kliewer et al..................... 116/114.5 |

Primary Examiner—Richard C. Queisser
Assistant Examiner—Daniel M. Yasich
Attorney, Agent, or Firm—Alexander, Sell, Steldt & Delahunt

[57] ABSTRACT

A biased rod-tube visual indicator is restrained by a fusible binder. At a selected temperature, the binder will release the rod to an extended position. A reverse spiral coil is provided at the top inner edge of the tube to guide the indicating rod to its extended position.

7 Claims, 5 Drawing Figures

COILED EDGE GUIDE FOR ROD-TUBE SIGNAL DEVICE AND METHOD

Signalling devices provide the service of indicating critical environmental conditions. These critical conditions may be of temperature, humidity, physical stress, impact, voltage, amperage, etc. The signalling devices are intended to automatically respond to critical variations or extremes of these conditions, the effects of the response being such as to indicate a predetermined degree of variation to an observer. Indicative of such devices are the devices for registering shock of U.S. Pat. No. 3,020,874, circuit breakers in housing, and temperature indicating devices such as shown in U.S. Pat. Nos. 945,978; 3,140,611; 3,626,897 and 3,724,360. Many different structures and indicating signals are known in the art, from a simple visual signal to more complicated signals which engage automatic devices in response to critical environmental changes, such as automatic sprinklers to combat fires.

The present invention relates to those signalling devices which operate on the basis of a visual indication of attainment of a critical condition, said visual indication being supplied by a rod or rod-like element which is projected into view by a force restrained until the critical condition has been surpassed. The temperature indicating devices referred to above are the most exemplary devices of this kind.

The temperature indicating devices of the prior art operate, in general, in the manner that a rod or rod-like signalling element is contained in a housing, usually elongate and having a hole in one end from which the rod can extend. Some means of supplying a force sufficient to raise the rod into view must be provided in the element (e.g., a spring, buoyancy in a liquid medium, compressed gas, magnets, etc.) This means of supplying a force must also be provided in such a way as to accomplish the raising of the signal rod only when a critical condition has been surpassed. With regard to temperature signalling devices this can readily be accomplished by providing a locking mechanism which will unlock at a specified temperature, as with a fusible binder material which will lock a spring and/or rod within a housing until its melting temperature is exceeded or attained.

The present invention relates to a useful signalling device.

The present invention further relates to a structure useful in signalling devices wherein indicator rods are raised into view by released forces so as to provide a visual signal.

The present invention will become apparent from the description provided herein.

Signalling devices of the present invention all comprise an elongate hollow element, usually tubular, containing therein a means for providing a force sufficient to raise a rod or rod-like element so that it extends outside the hollow element so as to provide a visual signal. The devices also comprise some means for restraining the rod or rod-like element from extending outside the hollow element. The present invention specifically relates to a sealing and guiding function provided by particulars in the structure of the element.

THE HOUSING

The housing, the hollow elongate element, must be made of a material which is capable of withstanding for reasonable periods of time the extremes of the environment into which it is placed. To this end, the material composition of the housing would be selected upon the requirements of the particular environment of use. Such materials as metal, thermoplastic resins, thermoset resins, natural resins, rubbers, glass, ceramics, wood, stone, etc. could be used depending upon the conditions to which the device is to be subjected. The preferred materials are thermoplastic and thermoset resins as will become apparent from a further understanding of the invention.

The shape of the housing element may vary. Cylindrical cross-sections are preferred because of their ease of manufacture, but any shape, symmetrical or asymmetrical, may be used. The exterior of the housing and its general shape will depend upon its intended use. In the case of electrical response measurement and signalling, the housing must have a structure which will enable appropriate attachment into an electrical circuit, e.g., exterior wires leading to the responsive locking mechanism inside the housing.

In the case of temperature indicating devices which are physically inserted into food or semi-solid objects, a pointed insertion tip and/or barbs are desirable to facilitate insertion and secure the element after insertion.

In the case of signalling excessive shock, the housing must be capable of providing intimate and tight securement into a surface or object. This may be accomplished for example by an expandable surface, e.g., an extensible surface and an inflatible element inside the extensible surface.

Of particular preference in the construction of the housing are polymeric materials because of the general ease in manufacturing the product and in enabling one piece construction of the housing. Such materials include the thermoplastic resins (e.g., polyesters, polyolefins, polyamides, polyvinyl resins, polycarbonates, etc.), thermoset resins (e.g., acrylic polymers, polyesters, polysilanes, polysiloxanes, epoxy resins), and natural resins.

RESPONSE MECHANISM

Each signalling device must have a responsive locking mechanism. These must provide restraint on the signalling element prior to some certain condition, which condition will act to release the restraint on the signalling element, enabling the visual signal to occur. These mechanisms must therefore comprise a means for raising the signal rod or rod-like element out of the housing, and a means for temporarily restraining the raising means from causing the visual signal until certain critical, predetermined conditions are met or surpassed.

Such responsive locking mechanisms are well exemplified in the art, but a brief description will enhance an understanding of the scope of the present invention.

An electrically responsive locking mechanism would have, for example, a spring mechanism to advance the rod signalling element, a conductive alloy securing the compressed spring to the housing or against the rod so as to prevent action by the spring to extend the signalling element into view, the conductive alloy melting when electrical current passing through it exceeds a certain amperage, and positive and ground wires entering the housing and making electrical contact through the alloy in the manner of a fuse. Thus, when amperage exceeds a predetermined level, the alloy will soften, releasing the spring which will then force the signal element into view.

The restraining means may either secure the indicating element itself directly to the housing wall, or may directly block the action of the means for providing the force which extends the element (e.g., directly locking the coils of a spring, closing an access route from compressed gas, etc.).

Similar constructions are useful in devices responsive to other critical conditions. For heat sensitive signalling devices, for example, the electrical connection to the binding alloy would not be necessary, but the alloy must be selected so as to melt at a desired temperature. This type of construction is well known in the prior art such as the above-cited U.S. patents and many other publications.

Humidity sensitive responsive locking mechanisms can be made by locking the spring with a water absorptive material which will lose its structural integrity where subjected to humidity beyond a critical amount for an excessive time period. A hygroscopic salt would be useful as the responsive binder material in this case.

THE INVENTION

It has been found that a specific construction of the housing element in signalling devices simplifies manufacture, reduces costs, and adds and combines new functions and safeguards into responsive signalling devices.

More specifically, the present invention relates to a housing having an annular lip at the open, signalling end of an indicating device as disclosed above. This annular lip comprises a flexible, resinous edge which is folded down into the housing and then further folded away from the signalling rod. This may be accomplished by a reverse curl in which the edge spirals into a spring-like annular lip.

It is preferred that the annular lip be continuous or uninterrupted around the housing, but any discontinuous edging of the required construction which provides a series of guiding elements or a balanced guiding force against the signalling element is acceptable in the practice of this invention.

The folded down lip provides a number of characteristics to the signalling device which are important. The shape of the curled lip about the signalling rod tends to prevent penetration into the housing by materials which could permanently lock the responsive element.

The surface area of the folded down lip is parallel with the signalling rod and provides a contact surface area which is minimal due to the curved nature of the folding. For a given spring mechanism force, the resulting shear force over this surface area of said folded lip is extremely high and will assist in breaking through any foreign material that may form in this narrow passage.

The flexible lip forming the circumference of the opening in the at least one open end of the housing also forms a surface against which shoulders, provided on the signalling element to prevent it from completely leaving the housing, will form a close seal without the expense of molding a separate rigid receiving element for insertion into the housing.

The fold back lip seal also is surprisingly effective in keeping the indicator rod centered in the housing and in the open end. Even when the signalling device is subjected to undesirable stress and rough handling sufficient to deform the device, the rod remains centered because of the conformability and general design of the sealing element.

A better understanding of the present invention can be obtained by reference to the drawings.

Figure 1:
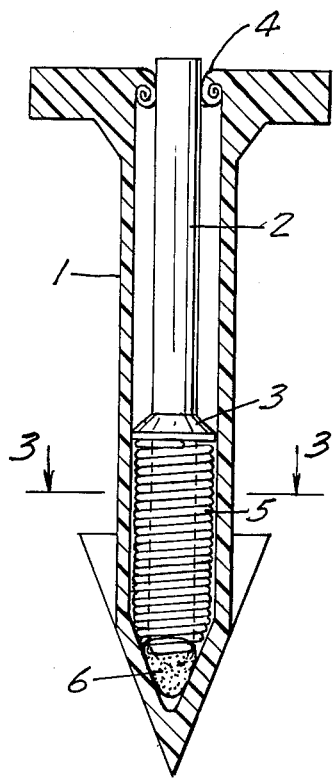
FIG. 1 is a cross-sectional view of the rod-tube indicator.
Figure 2:
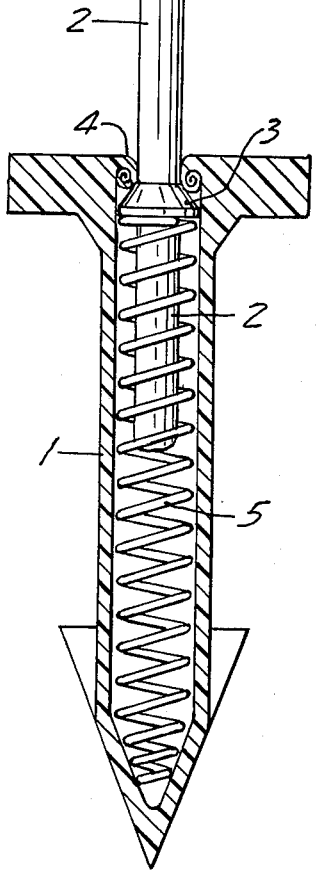
FIG. 2 is a view of the indicator of FIG. 1 released to an extended position.

As can be seen in FIGS. 1-2, the housing 1, enclosed as indicating rod 2, with a shoulder 3 design to form a seal with a mating surface formed by the reverse curl lip 4 near the open end of the signalling device. A spring 5 and metal alloy binder 6 are also shown. The housing was originally formed with material extending from the inside edge of the housing wall vertically at the top of the device, forming a truncated hollow cone element 7 at the top as in FIG. 3. A heated conical element then formed the material into an annular, reverse curl lip 4 around the top of the housing. The exterior of the heated conical element impinges upon the exterior of the truncated hollow cone element to best form the reverse curl.

If the lip were to be formed on other than a unitary thermoplastic molded element, a sleeve element having a raised truncated hollow cone element could be inserted into a housing with means to secure the sleeve to the housing.

Figure 3:
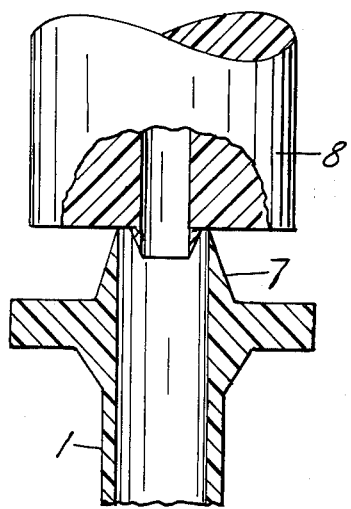
FIGS. 3-5 illustrates a tool used to form the reverse spiral curl on the tube.
Figure 4:
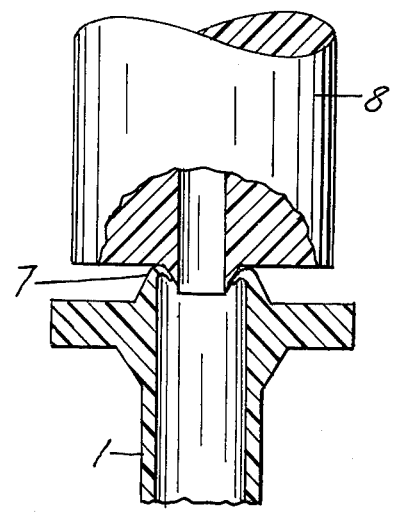
Figure 5:
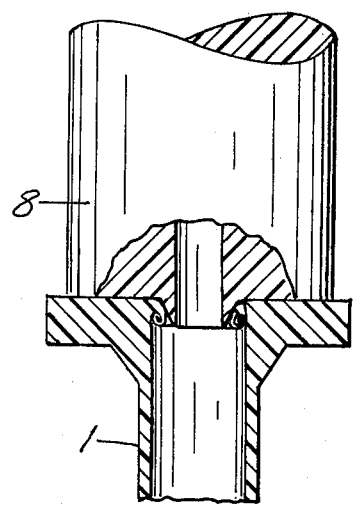

FIGS. 3, 4 and 5 show the sequential manner in which the heated element 8 forms the curled lip 4 from the cone element 7 on the housing. In forming a signalling device it is desirable to have the plunger (signalling rod), biasing means, and restraining means within the cavity prior to curling the edge lip.

The following example will show how the present invention is made for a temperature signalling device.

EXAMPLE

A one-piece housing for a temperature responsive gauge according to the present invention was made by injection molding food grade nylon-6. The length of the housing from tip to the raised edge later formed into the curl-down seal was 1.145 inches. The edge later formed into the seal appeared as a truncated hollow cone about the 0.160 inch diameter cavity in the shell, rising to a height of 0.050 inches. The interior portion of the truncated hollow cone was an extension of the interior cavity wall and the exterior portion sloped away from the upper edge of the cone at an angle of about 30°. Prior to curling the lip seal, a metal alloy pellet having a sharp predetermined melting temperature of about 174°F was inserted into the cavity. A spring and indicating rod (of nylon-6 colored red) was thereafter inserted into the cavity. A molding element having a flat surface (or a raised conical or curved section to enhance curling could be used) was heated to 375°F and impacted the raised truncated cone portion with 300 pounds pressing force. The pressure and heat immediately curled the edge down into the cavity and around the indicating rod. The alloy was melted by heating, the rod depressed to compact the spring and force the rod or spring into the melted alloy, and the alloy was cooled to bind the rod and restrain the action of the spring. Upon subsequent heating to the melting temperature of the binder, the binder melted and the spring forced the plunger to its extended position. No sticking was noted.

One other benefit of the present invention should be pointed out, and that is the ease of controlling the size of the guiding element for the indicating rod. By increasing the size of that portion of the heating element which, in preferred practices of the invention, enters into the hollow cavity (note FIGS. 3, 4, and 5), the diameter of the hole defined by the curl-down lip can be easily varied. This would enable various size indicating rods to be used with one size of housings.

I claim:

1. A signalling device for indicating the attainment or surpassing of a critical condition comprising:
   1. an elongate hollow element having at least one open end,
   2. an indicating element within the hollow of the elongate hollow element and having sufficient clearance between the indicating element and the interior walls of the elongate hollow element to be capable of allowing the indicating element to freely slide within the hollow,
   3. means for providing a force capable of extending the indicating element out of the at least one open end so as to provide a visual signal, and
   4. means for providing a restraint on the indicating element so that it will not extend out of the at least one open end so as to provide a visual signal until a predetermined condition has been attained or surpassed, said signalling device being characterized by said at least one open end having about the opening an edge lip, said edge lip being both (1) a restraining means for said indicating element in an extended position and (2) a flexible polymeric resin material having a reverse spiral coil curl that provides a guiding element for said indicating element about the opening at the at least one open end.

2. The signalling device of claim 1 wherein the means for providing a restraint on the means capable of extending the indicating element from said at least one open end is a heat softenable binder material which either secures the indicating element to the elongate hollow element or directly restrains the means for providing a force capable of extending the indicating element.

3. The signalling device of claim 1 wherein the elongate hollow element and edge lip comprise a one-piece construction from a moldable polymeric resin.

4. The signalling device of claim 1 wherein the means for providing a restraint is releasable upon the attainment of a predetermined temperature.

5. The signalling device of claim 4 wherein the restraining means is a meltable binder.

6. The signalling device of claim 1 wherein the reverse curl is within the at least one open end of the hollow element.

7. A process for forming a signalling device having a spiral coil curl edge seal comprising:
   1. an elongate hollow element having at least one open end,
   2. an indicating element within the hollow of the elongate hollow element and having sufficient clearance between the indicating element and the interior walls of the elongate hollow element to be capable of allowing the indicating element to freely slide within the hollow, said indicating element being in the form of a rod,
   3. means for providing a force capable of extending the indicating element out of the at least one open end so as to provide a visual signal,
   4. means for providing a restraint on the indicating element so that it will not extend out of the at least one open end so as to provide a visual signal until a predetermined condition has been attained or surpassed, and
   5. a spiral coil curl edge seal at said at least one open end which provides a guiding means for said indicating element in an extended position, which comprises forming a truncated hollow cone element forming a raised edge about said at least one open end of said elongate hollow element, pressing and heating the raised edge of said truncated hollow cone element so as to form a flexible spiral coil curl about said at least one open end from the said raised edge.

* * * * *